(12) United States Patent
Mori (10) Patent No.: US 8,289,592 B2
(45) Date of Patent: Oct. 16, 2012

(54) IMAGE PROCESSING APPARATUS AND METHOD WITH COLOR SPACE CONVERSION DEPENDING ON ENVIRONMENTAL LIGHT AND DISPLAY OF COLOR DIFFERENCES IN AREAS OF THE IMAGE

(75) Inventor: Hiroshi Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 474 days.

(21) Appl. No.: 12/641,922

(22) Filed: Dec. 18, 2009

(65) Prior Publication Data

US 2010/0157341 A1 Jun. 24, 2010

(30) Foreign Application Priority Data

Dec. 22, 2008 (JP) ................................. 2008-326587

(51) Int. Cl.
*H04N 1/60* (2006.01)
(52) U.S. Cl. .......................... 358/518; 358/504; 358/527
(58) Field of Classification Search .................... 358/1.9, 358/2.1, 501, 504, 509, 518–523, 527, 406, 358/475; 382/162, 167
See application file for complete search history.

(56) References Cited

U.S. PATENT DOCUMENTS

| 5,754,682 A * | 5/1998 | Katoh ............................ 382/162 |
| 6,356,364 B2 * | 3/2002 | Matsushiro et al. ............. 358/1.9 |
| 6,567,543 B1 * | 5/2003 | Shiraiwa et al. ................ 382/167 |
| 6,628,822 B1 * | 9/2003 | Nakabayashi et al. ......... 382/162 |
| 6,859,551 B2 * | 2/2005 | Ohga .............................. 382/167 |
| 6,987,519 B2 * | 1/2006 | Kumada et al. ................ 345/603 |
| 6,999,617 B1 * | 2/2006 | Ohga .............................. 382/167 |
| 7,027,067 B1 * | 4/2006 | Ohga .............................. 358/518 |
| 7,158,144 B2 * | 1/2007 | Shiraiwa et al. ............... 358/518 |
| 7,599,553 B2 * | 10/2009 | Ohga .............................. 382/167 |
| 7,697,167 B2 * | 4/2010 | Hatori ............................ 358/2.1 |
| 8,081,819 B2 * | 12/2011 | Ohga .............................. 382/167 |
| 2010/0195127 A1 * | 8/2010 | Sawada .......................... 358/1.9 |

* cited by examiner

*Primary Examiner* — Scott A Rogers
(74) *Attorney, Agent, or Firm* — Fitzpatrick, Cella, Harper & Scinto (57) ABSTRACT

An image processing apparatus for supplying image data, to be formed by an image forming apparatus, to the image forming apparatus includes an obtaining unit for obtaining information on first environment light and second environment light different from the first environment light; a converting unit for converting data, defined by a color space independent of the image forming apparatus, of the image data into first image data defined by a color space dependent of the image forming apparatus depending on the first environment light and then for converting the first image data into second image data defined by a color space independent of the image forming apparatus depending on the second environment light; a discriminating unit for discriminating whether or not a color difference between the first image data and the second image data is a predetermined value or more in an area in which the first image data and the second image data correspond to each other; and a display controlling unit for controlling a display unit so that the image data is displayed on the display unit in an image area including an area in which the color difference is the predetermined value or more and including an area in which the color difference is less than the predetermined value.

7 Claims, 12 Drawing Sheets

| PRINTER A, G.P., PRINT MODE C | | | | |
|---|---|---|---|---|
| NORMAL RGB→L*a*b CORRECTION TABLE | | | | |
| N.L. (D50) | PRINTER A, G.P., PRINT MODE B | | | |
| | NORMAL RGB→L*a*b CORRECTION TABLE | | | |
| H.C.R.F.L. | N.L. (D50) | PRINTER A, G.P., PRINT MODE A | | |
| | | NORMAL RGB→L*a*b CORRECTION TABLE | | |
| T.B.F.L. | H.C.R.F.L. | N.L. (D50) | L*a*b→PRINTER RGB CONV. TABLE | |
| | | | PRINTER RGB→L*a*b CONV. TABLE | |
| ... | T.B.F.L. | H.C.R.F.L. | L*a*b→PRINTER RGB CONV. TABLE | |
| | | | PRINTER RGB→L*a*b CONV. TABLE | |
| | ... | T.B.F.L. | L*a*b→PRINTER RGB CONV. TABLE | |
| | | | PRINTER RGB→L*a*b CONV. TABLE | |
| | | ... | L*a*b→PRINTER RGB CONV. TABLE | |
| | | | PRINTER RGB→L*a*b CONV. TABLE | |

| PRINTER A, C.P., PRINT MODE C | | | | |
|---|---|---|---|---|
| NORMAL RGB→L*a*b CORRECTION TABLE | | | | |
| N.L. (D50) | PRINTER A, C.P., PRINT MODE B | | | |
| | NORMAL RGB→L*a*b CORRECTION TABLE | | | |
| H.C.R.F.L. | N.L. (D50) | PRINTER A, C.P., PRINT MODE A | | |
| | | NORMAL RGB→L*a*b CORRECTION TABLE | | |
| T.B.F.L. | H.C.R.F.L. | N.L. (D50) | L*a*b→PRINTER RGB CONV. TABLE | |
| | | | PRINTER RGB→L*a*b CONV. TABLE | |
| ... | T.B.F.L. | H.C.R.F.L. | L*a*b→PRINTER RGB CONV. TABLE | |
| | | | PRINTER RGB→L*a*b CONV. TABLE | |
| | ... | T.B.F.L. | L*a*b→PRINTER RGB CONV. TABLE | |
| | | | PRINTER RGB→L*a*b CONV. TABLE | |
| | | ... | L*a*b→PRINTER RGB CONV. TABLE | |
| | | | PRINTER RGB→L*a*b CONV. TABLE | |

IMAGE PROCESSING APPARATUS AND METHOD WITH COLOR SPACE CONVERSION DEPENDING ON ENVIRONMENTAL LIGHT AND DISPLAY OF COLOR DIFFERENCES IN AREAS OF THE IMAGE

FIELD OF THE INVENTION AND RELATED ART

The present invention relates to an image processing apparatus for processing an image depending on observation environment light and relates to an image processing method.

As described in Japanese Laid-Open Patent Application (JP-A) 2007-166402, it has been conventionally known the image processing apparatus for evaluating a color reproduction characteristic of an image output apparatus such as a printer on the basis of illumination information designated on a user interface (UI) by a user, as an example of an image data conversion in which the observation environment light was taken into account.

In the image processing apparatus, spectral data is obtained from an output image. Further, the image processing apparatus calculates the color reproduction characteristic of the image output apparatus under an observation environment, on the basis of the spectral data and the illumination information designated on the UI by the user. Then, the user determines, from the calculated colorimetric value, the color reproduction characteristic so as to satisfy a desired condition designated by the user under a plurality of pieces of the illumination information designated by the user on the UI.

JP-A 2006-254106 discloses a system for displaying a simulation image. In this system, as an example of an image processing user interface, when a print original is set on a multi-function machine, the multi-function machine reads the print original and obtains image data for simulation in the form of reduced-resolution printing image data. The thus-obtained data is transferred to a client PC.

The client PC displays a simulation image and at the same time, discriminates the presence or absence of an improper reproduction area in which a color difference between the simulation image and the original image in the printing by the multi-function machine is a threshold or more, on the basis of the data of the simulation image.

When the improper reproduction area is present, the improper reproduction area is clearly shown on the simulation image. Further, when change setting for a printing condition is designated by the user, the simulation image is displayed again depending on the printing condition subjected to the change setting.

When confirmation of the printing condition is made, the confirmed printing condition is sent to the multi-function machine and under the printing condition, printing on a recording sheet is effected.

However, generally, a print has a light source dependency by a type or composition of ink and a color appearing manner is changed depending on the type of illumination light in the observation environment of the print. However, in the case where the observation environment light is changed, the user cannot know an image area in which the change in color is large. Therefore, the user cannot know in advance the printing condition (such as the type of the printer, the type of sheet, or a printing mode) under which a degree of the change in color appearing manner depending on the observation environment light is small.

SUMMARY OF THE INVENTION

The present invention has been accomplished in view of the above-described circumstances.

A principal object of the present invention is to provide an image processing apparatus for presenting to a user an image area in which a degree of change in appearing color is large in the case where a light source with which an output image is observed is changed.

Another object of the present invention is to provide an image processing method of supplying the image data to be formed by the image forming apparatus to the image forming apparatus.

According to an aspect of the present invention, there is provided an image processing apparatus for supplying image data, to be formed by an image forming apparatus, to the image forming apparatus, the image processing apparatus comprising:

an obtaining unit for obtaining information on first environment light and second environment light different from the first environment light;

a converting unit for converting data, defined by a color space independent of the image forming apparatus, of the data into first image data defined by a color space dependent of the image forming apparatus depending on the first environment light and then for converting the first image data into second image data defined by a color space independent of the image forming apparatus depending on the second environment light;

a discriminating unit for discriminating whether or not a color difference between the first image data and the second image data is a predetermined value or more in an area in which the first image data and the second image data correspond to each other; and a display controlling unit for controlling a display unit so that the image data is displayed on the display unit in an image area including an area in which the color difference is the predetermined value or more and including an area in which the color difference is less than the predetermined value.

According to another aspect of the present invention, there is provided an image processing method for supplying image data, to be formed by an image forming apparatus, to the image forming apparatus, the image processing method comprising:

a step of obtaining information on first environment light and second environment light different from the first environment light;

a step of converting data, defined by a color space independent of the image forming apparatus, of the image data into first image data defined by a color space dependent of the image forming apparatus depending on the first environment light and then for converting the first image data into second image data defined by a color space independent of the image forming apparatus depending on the second environment light;

a step of discriminating whether or not a color difference between the first image data and the second image data is a predetermined value or more in an area in which the first image data and the second image data correspond to each other; and a step of displaying the image data is on a display unit in an image area including an area in which the color difference is the predetermined value or more and including an area in which the color difference is less than the predetermined value.

According to the present invention, it is possible to present to the user the image area in which the degree of change in appearing color is large with respect to a plurality of environment light sources with which the output image is observed.

DETAILED DESCRIPTION OF THE PREFERRED EMBODIMENTS

Hereinbelow, embodiments of the present invention will be specifically described with reference to the drawings. Incidentally, the same structural elements or members are represented by the same reference numerals or symbols, thus being omitted from redundant description.

In the image processing apparatus according to the present invention, first, image data (RGB data) defined in a standard RGB color space is input and then color correction is made in an appearance color space (e.g., uniform perceived color space CIELAB) to obtain image data (Lab data).

Next, the image processing apparatus converts the obtained image data (Lab data) which is independent of the device correspondingly to first environment light to be corrected (light to be corrected) to obtain device-dependent image data (which is image data converted into color area display which can be reproduced by the printer; hereinafter referred to as printer RGB data). The image data (printer RGB data) is converted on the appearance color space correspondingly to second environment light to obtain new image data (Lab data). The image processing apparatus displays, as an image area in which a degree of change in color is large, a color area in which a color difference between the thus-obtained new image data (Lab data as second image data) and original image data (Lab data as first image data) in the case where an observation environment light is changed from first environment light to second environment light.

As a result, the user can confirm the image area in which the color change due to the change in environment light is observed and a degree of color change intensity on a screen, thus capable of knowing that which color in which area is observed in a changed state in the resultant image in advance with respect to the observation environment light which is not an object to be corrected. As a result, the user can know in advance the type of printer, the type of sheet, the printing mode, and the like by which a degree of the change in color appearing manner with respect to the observation environment light is small.

An operation of the image processing apparatus according to the present invention will be described below.

<First Embodiment>

Figure 1:
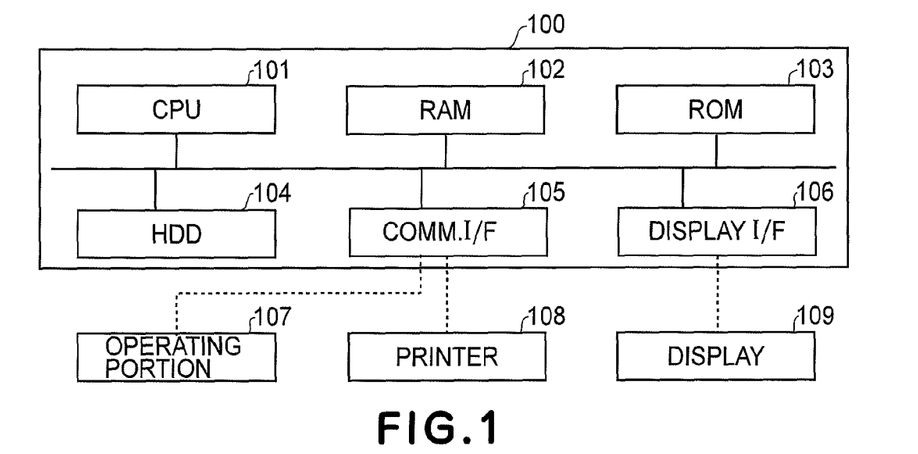
FIG. 1 is a schematic view showing a hardware configuration of the image processing apparatus according to the present invention.

FIG. 1 is a schematic view showing a hardware configuration of the image processing apparatus according to the present invention. As the image processing apparatus 100, information processing apparatus such as a personal computer is used. A CPU 101 is a central processing unit for executing an operating system, application programs, device drives, and the like to effect integrated control of respective portions in the image processing apparatus 100.

A RAM 102 is random-access memory for providing a work area for the CPU 101. A ROM 103 is a read-only memory for storing a boot program such as BIOS. An HDD 104 is a fixed storage such as a hard disk drive and stores not only computer programs such as the operating system and various driver programs but also image data such as a test pattern image data.

A communication interface (I/F) is an interface for performing data communication with an external device such as a device of USB, IEEE 1394, wired LAN, wireless LAN, or the like. A display interface (I.F) 106 controls a display device 109 connected externally or internally so that image information or the like is displayed on the display device 109.

An operating portion 107 is an input device such as a pointing device or a key entry device. A printer 108 is an image forming apparatus of an ink jet type or a laser beam type in which the image is to be formed on media. The display device 109 displays the image data or the like and as the display device, a liquid crystal display or the like is used.

Figure 2:
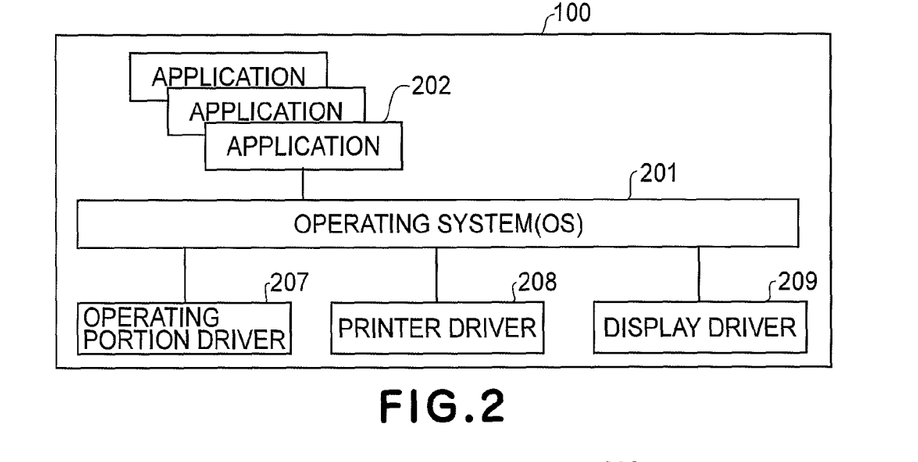
FIG. 2 is a schematic view showing a software configuration of the image processing apparatus.

FIG. 2 is a schematic view showing a software configuration of the image processing apparatus 100. With reference to FIGS. 1 and 2, flow during printout will be described. As the printer 108 for performing the printout, an ink jet print or the like which has been generally popularized can be used. During the printout of output image data, the printout is requested from an application 202 to an OS 201. For example, in this case, drawing instructions are issued to the OS 201. Of the drawing instructions, a portion constituted by a graphics drawing instruction corresponds to a graphics data portion of the output image and a portion constituted by an image drawing instruction corresponds to an image data portion of the output image.

The OS 201 receives the output request from the application and issued the drawing instructions to a printer driver 208 correspond to an output printer. The print driver 208 processes a print request and the drawing instructions which are input from the OS 201 and prepares print data capable of being printed by the printer 108 and then transfers the print data to the printer 108.

For example, in the case where the printer 108 is a raster printer, the printer driver 208 successively executes image correction processing in response to the drawing instructions from the OS 201. Then, the printer driver 208 successively rasterizes the drawing instructions in RGB 24-bit page memory. After all the drawing instructions are rasterized, the printer driver 208 converts the contents of the RGB 24-bit page memory into data format (e.g., CMYK data) for the image which can be printed by the printer 108 and transfers the data format to the printer 108.

Figure 3:
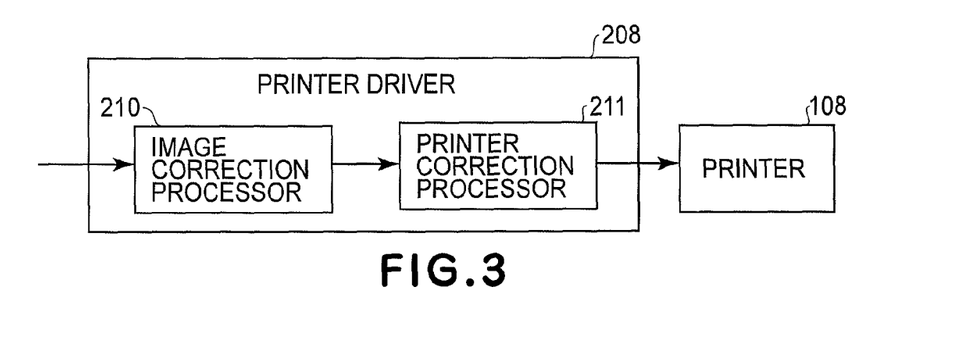
FIG. 3 is a schematic view for illustrating a process performed by a printer driver.

FIG. 3 is a schematic view for illustrating the processing performed by the printer driver 208. An image correction processing portion 210 effects image correction processing with respect to color information contained in the drawing instructions input from the OS 201. The image correction processing portion 210 converts, e.g., RGB color information into luminance/color difference signal and subjects the luminance signal to exposure correction processing and then inversely converts the corrected luminance/color difference signal into RGB color information.

A correcting processing portion 211 for the printer rasterizes the drawing instruction on the basis of the RGB color information which has been subjected to the image correction processing and forms a raster image in the RGB 24-bit page memory by the rasterization. Then, the correcting processing portion 211 effects color matching processing for performing color reproduction space mapping, color-separation processing into CMYK, gamma correction, half-tone correction, and the like. Thereafter, the correcting processing portion 211 forms CMYK data depending on color reproducibility of the printer with respect to each pixel to transfer printable image data to the printer 108.

(User Interface)

Figure 4:
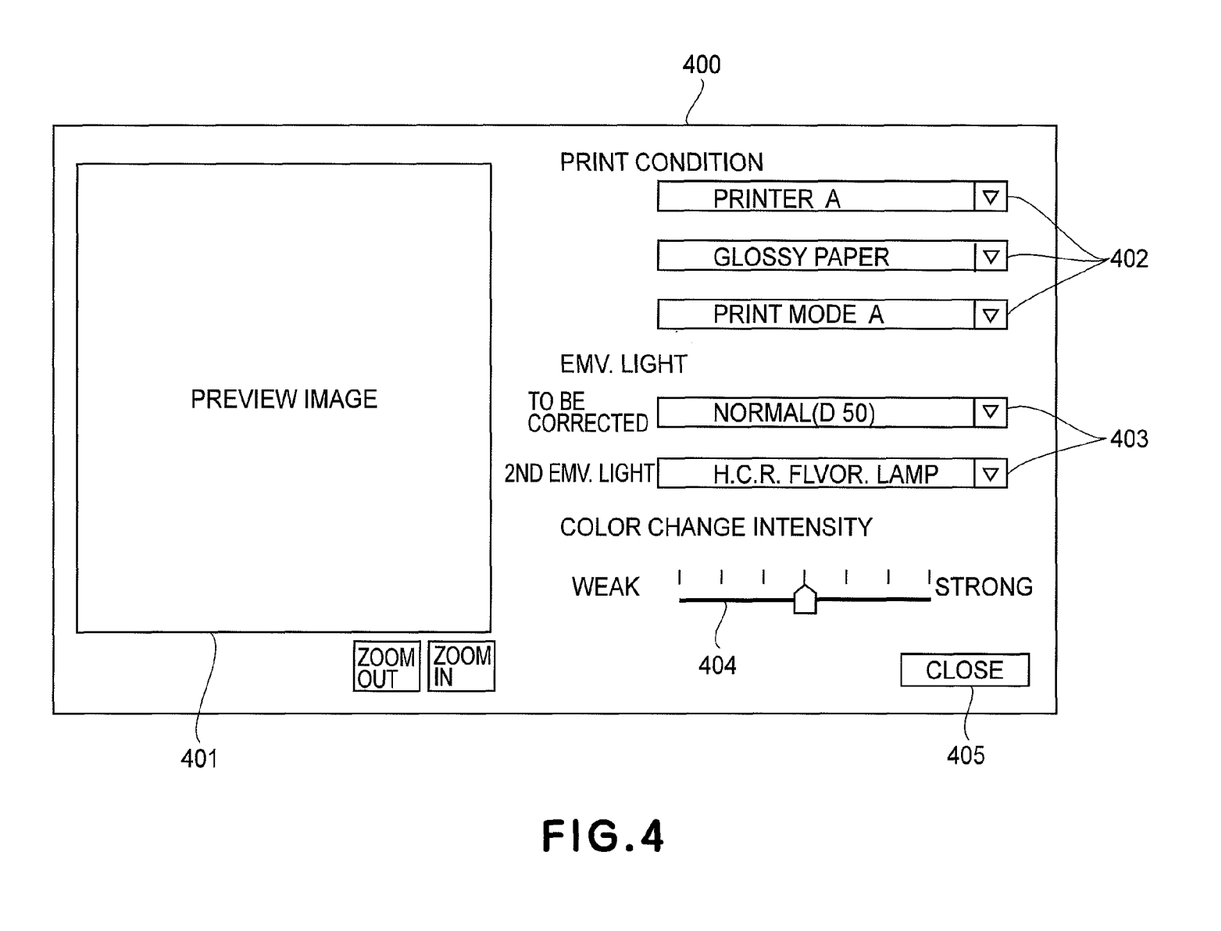
FIG. 4 is a schematic view showing an example of a user interface in First Embodiment.
Figure 8:
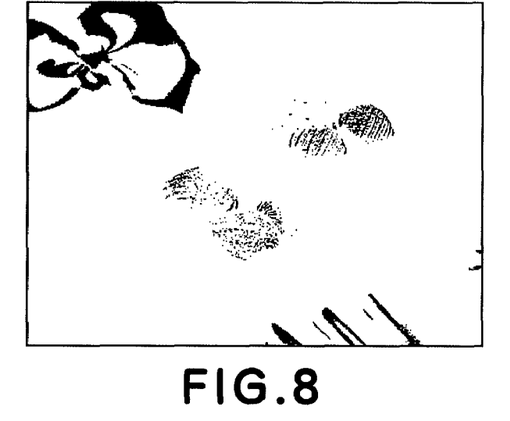
FIG. 8 is a schematic view showing an example of display in the case where a print color change intensity is weak.
Figure 9:
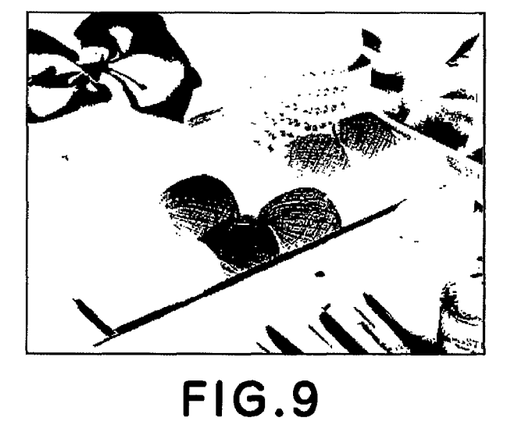
FIG. 9 is a schematic view showing an example of display in the case where the print color change intensity is medium.
Figure 10:
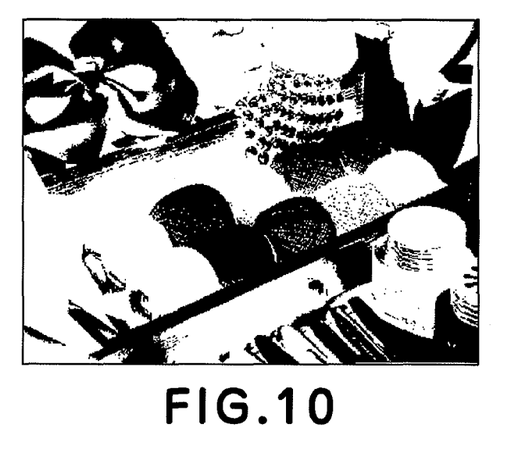
FIG. 10 is a schematic view showing an example of display in the case where the print color change intensity is strong.
Figure 15:
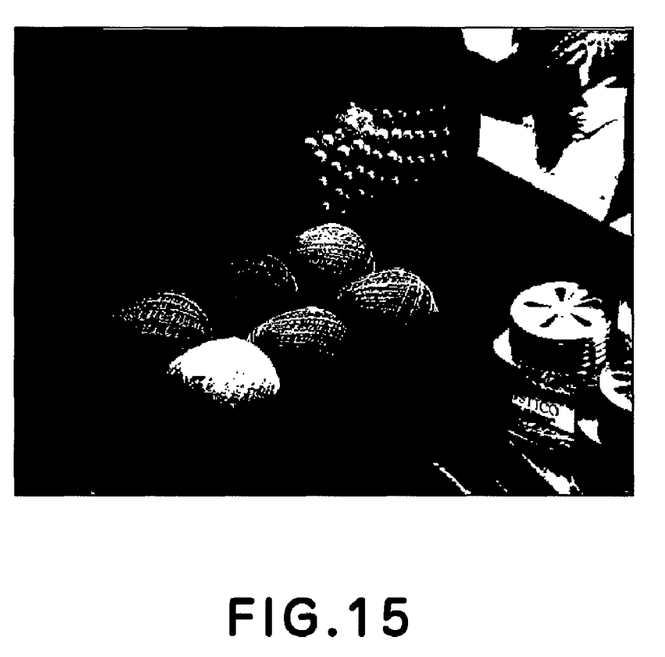
FIG. 15 is a schematic view showing an original image.

FIG. 4 is a schematic view showing an example of a user interface in this embodiment. A user interface 400 displays a color difference area discrimination image on a display 401. Further, the user interface 400 can also display a partly enlarged image. With respect to an original image shown in FIG. 15, display examples of the color difference area discrimination image are shown in FIGS. 8, 9 and 10, respectively.

The user can set the type of printer, the type of sheet, and the printing mode by using a display 402, in which respective times are displayed in a pop-up menu system. The user can appropriately select and set the respective items. By each pop-up menu, a list of selected item is displayed by selecting an inverted triangle area, located at a right end of each rectangular area, with a pointer or the like. The user selects an objective item from the list of the selected item. In this embodiment, each pop-up menu functions as a receiving unit for receiving user's selection for an associated item. Incidentally, in this embodiment, all of the type of printer, the type of sheet, and the printing mode can be set but at least one of these pieces of information can also be set.

A display 403 is used in the case where light to be corrected and second environment light are set. Each item is, similarly as in the case of the display 402, displayed as a list of selected item in the pop-up menu system. The user can select the item from the list and sets the selected item. As a type of environment light to be set, there are normal (standard) light (D50), high color rendering fluorescent lamp, three-waveform fluorescent lamp, and normal fluorescent lamp.

The user can adjust a degree of color difference discrimination tolerance by a slide bar 505 as a second receiving unit, so that an area with the degree of color difference discrimination tolerance designated by the user through the slide bar 404 is displayed on the display 401. For example, as shown in FIG. 4, in the case where a "medium" value of print color change intensity is set as an initial value, a color difference area of a medium degree is displayed on the display 401 (FIG. 9). Further, in the case where a "strong" value is set, the color difference area of a higher degree is displayed on the display 401 (FIG. 8). Further, in the case where a "weak" value is set, the color difference area of a lower degree is displayed on the display 401 (FIG. 10). When a button 405 is pushed down, the display of the user interface is completed.

Thus, in this embodiment, the user can visually confirm the area, in which the change in color depending on the change in environment light is observed, depending on the degree of the color change intensity.

(Flow of Processing)

Figure 5:
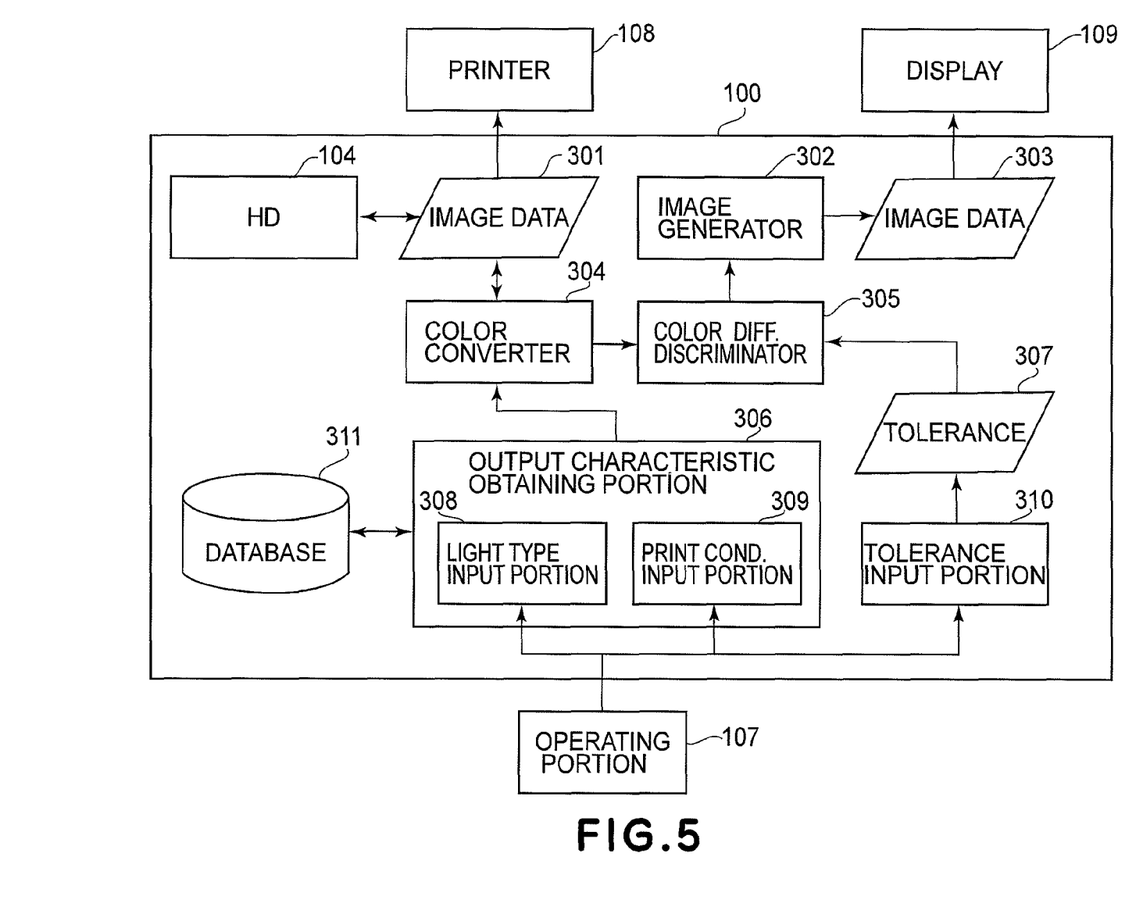
FIG. 5 is a block diagram showing an inner functional constitution of the image processing apparatus in First Embodiment.
Figure 6:
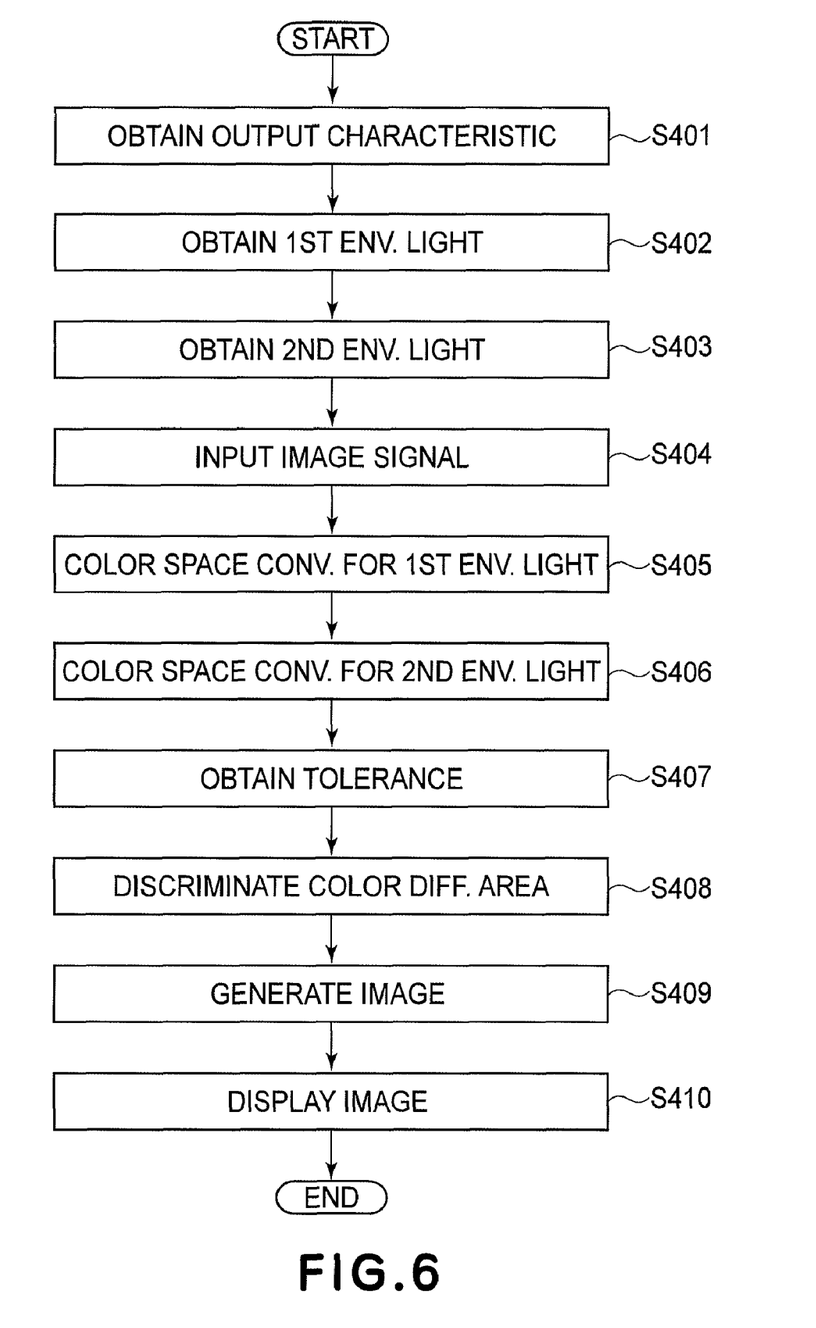
FIG. 6 is a flow chart showing a procedure of a display process of a color difference area image in First Embodiment.

The flow of the processing in this embodiment will be described based on FIG. 6 with reference to FIG. 5. FIG. 5 is a block diagram showing an inner functional constitution of the image processing apparatus 100. FIG. 6 is a flow chart showing a procedure of the display processing of the color difference area image in this embodiment. Each of steps in the flow chart is performed under control of the CPU 101 of the image processing apparatus 100.

First, in a step S401, a printing condition input portion 309 of an output characteristic obtaining portion 305 obtains the information on the type of printer, the type of sheet, and the type of printing mode selected by the user through an operating portion 107 and then obtains an output characteristic table (described later) corresponding to the information from a database 311.

In a step S402, an environment light type input portion 308 of the output characteristic obtaining portion 306 obtains the information on the type of first environment light selected by the user through the operating portion 107. Further, from the output characteristic table obtained in the step S401, a color correction table and a conversion table corresponding to the first environment light are obtained. Here, the color correction table is a table used for effecting the color conversion from the normal RGB space to L*a*b* space, and the conversion table corresponding to the first environment light is a table used for effecting the color conversion from the L*a*b* space to printer RGB space (color space represented by RGB capable of being reproduced by the printer).

In a step S403, the environment light type input portion 308 of the output characteristic obtaining portion 305 obtains information on the second environment light selected by the user through the operating portion 107. Further, from the output characteristic table obtained in the step S401, a conversion table corresponding to the second environment light is obtained. Here, the conversion table corresponding to the second environment light is a table used for effecting the color conversion from the printer RGB space to the L*a*b* space.

In a step S404, image data 301 is read from an HDD 104. In the HDD 104, a desired image data of the user is stored as the RGB data in advance. This image data may be input through an external interface or taken in through an image reading device such as a scanner.

In a step S405, a color conversion portion 304 effects the color correction processing of the image data 301 by using the color correction table obtained in the step S402 to perform the color conversion from the normal RGB space to the L*a*b* space, thus obtaining Lab data of appearance color space. Further, the color conversion portion 304 effects the color conversion of the Lab data by using the conversion table obtained in the step S402 to perform the color conversion from the L*a*b* space to the printer RGB space, thus obtaining the printer RGB data.

In a step S406, the color conversion portion 304 effects the color conversion of the printer RGB data obtained in the step S405 by using the conversion table obtained in the step S403. As a result, the printer RGB space is color-converted into the L*a*b* space to obtain the Lab data of the appearance color space. Here, in order to differentiate the Lab data obtained in this step from that obtained the step S405, the Lab data obtained in this step is referred to as L'a'b' data.

In a step S407, a color difference discrimination tolerance input portion 310 generates a color difference discrimination tolerance 307 depending on a designated value set by the user through the operating portion 107. In this embodiment, the color difference discrimination tolerance 307 is used as a reference value.

In a step S408, a color difference discriminating portion 305 obtains a color difference between the Lab data obtained in the step S405 and the L'a'b' data obtained in the step S406 with respect to the pixel in the image and compares the resultant color difference with the color difference discrimination tolerance 307 whether or not the color difference exceeds the color difference discrimination tolerance 307 to discriminate the color difference.

Here, the color difference is calculated according to the following equation (1):

$$\Delta E^*ab = \mathrm{SQRT}[(\Delta L^*) \times (\Delta L^*) + (\Delta a^*) \times (\Delta a^*) + (\Delta b^*) \times (\Delta b^*)] \quad (1)$$

In the equation (1), SQRT[ ] represents the square root of [ ], and $\Delta L^*$, $\Delta a^*$ and $\Delta b^*$ represent differences in $L^*$, $a^*$ and $b^*$, respectively.

That is, in this embodiment, the color difference refers to a difference in each color component defined by the Lab space independent of the device.

In a step S409, the color difference area discrimination image forming portion 302 generates the color difference area discrimination image data 303 on the basis of the result of the comparison in the step S408.

In a step S410, the image processing apparatus 100 displays the color difference area discrimination image data 303 corresponding to the color difference exceeding the color difference discrimination tolerance on the display 401 of the display device 109. That is, the display is made with respect to the pixel at which the color difference exceeds the color difference discrimination tolerance in the step S408. Here, the user can display the color difference area discrimination image data by changing the degree of the color difference through an operation of the slide bar 404 shown in FIG. 4. FIGS. 8, 9 and 10 shows examples of the color difference area discrimination images displayed with different degrees of the color difference.

(Output Characteristic Database)

Figure 7:
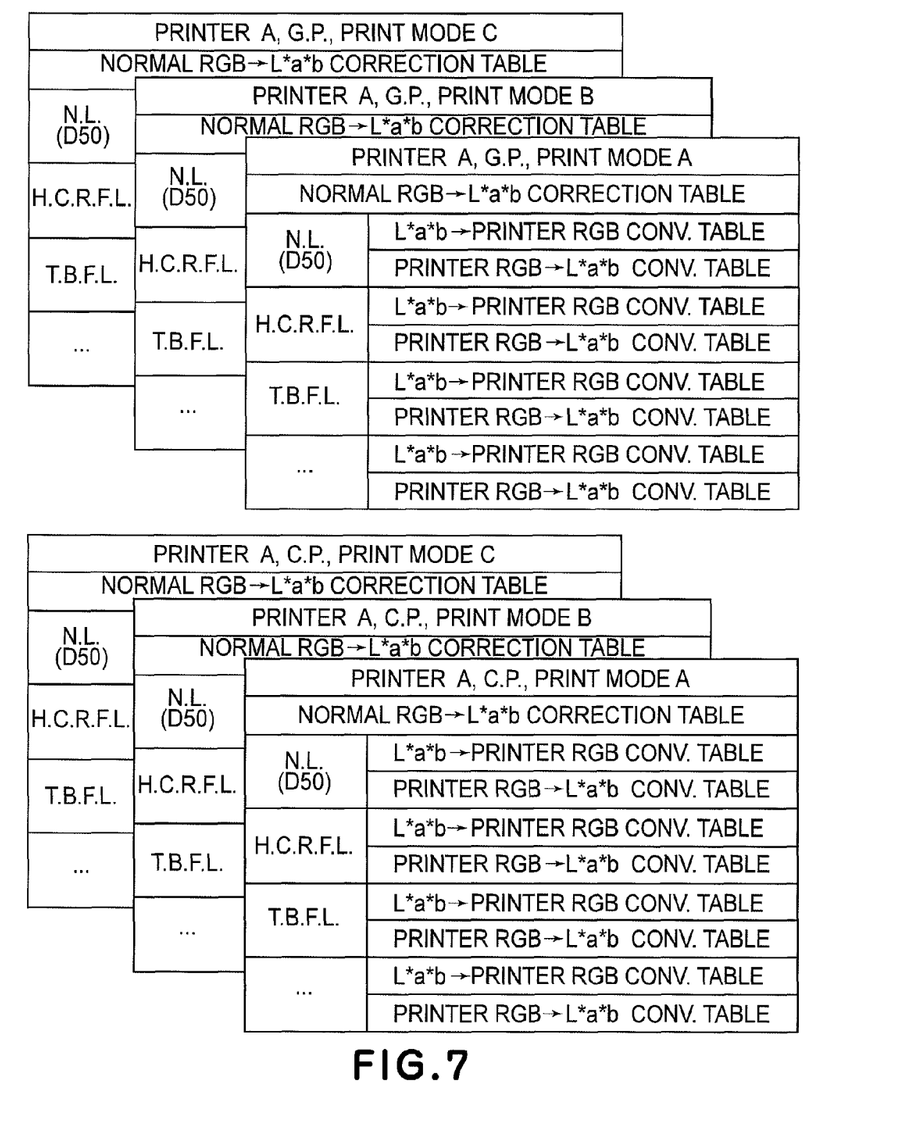
FIG. 7 is a schematic view showing a plurality of output characteristic tables stored in a database.

Next, the output characteristic table stored in the database 311 will be described. FIG. 7 is a schematic view showing a plurality of output characteristic tables stored in the database 311. As shown in the output characteristic tables are stored in the database 311 for each of the type of printer, the type of sheet (such as glossy paper (G.P.) or coated paper (C.P.)), the type of the printing mode.

Each of the output characteristic tables is constituted by including the color correction table and the conversion table set for each of the types of environment light. As described above, the color correction table is the table used for effecting the color conversion from the normal RGB space to the L*a*b* space. Further, the conversion table set for each of the types of environment light includes the table used for effecting the color conversion from the L*a*b* space to the printer RGB space and the table used for effecting the color conversion from the printer RGB space to the L*a*b* space.

As shown in FIG. 7, mutually different types of environment light are set. For example, the normal light (N.L.), the high color rendering fluorescent lamp (H.C.R.F.L.), and the three band fluorescent lamp (T.B.F.L.) are set.

The normal RGB color space described above is not limited to a particular RGB color space but may also be any color space such as Adobe RGB space or sRGB space. Further, in this embodiment, the CIELAB space is used as the appearance color space but any color appearance color space may also be used so long as the color space is a color appearance color space. For example, it is possible to use CIECAAM02 color space, CIECAM97s color space, and the like.

Further, in this embodiment, the conversion table into the appearance color space has been stored in the database in advance but such a constitution that spectral data of the output image is held as the output characteristic and the conversion table depending on the environment light is generated may also be employed. In this way, the image processing apparatus in this embodiment presents the area in which the degree of the color change due to the change in the observation environment light is large for each of the different output characteristics, so that the user can know the printing condition (the type of printer, the type of sheet, the type of printing mode, etc.) under which a degree of the change in color appearing manner depending on the type of the observation environment light.

<Second Embodiment>

Next, Second Embodiment of the present invention will be described. The hardware configuration, the software configuration and the database constitution in the image processing apparatus in this embodiment are similar to those described with reference to FIGS. 1 to 3 and 7.

(User Interface)

Figure 11:
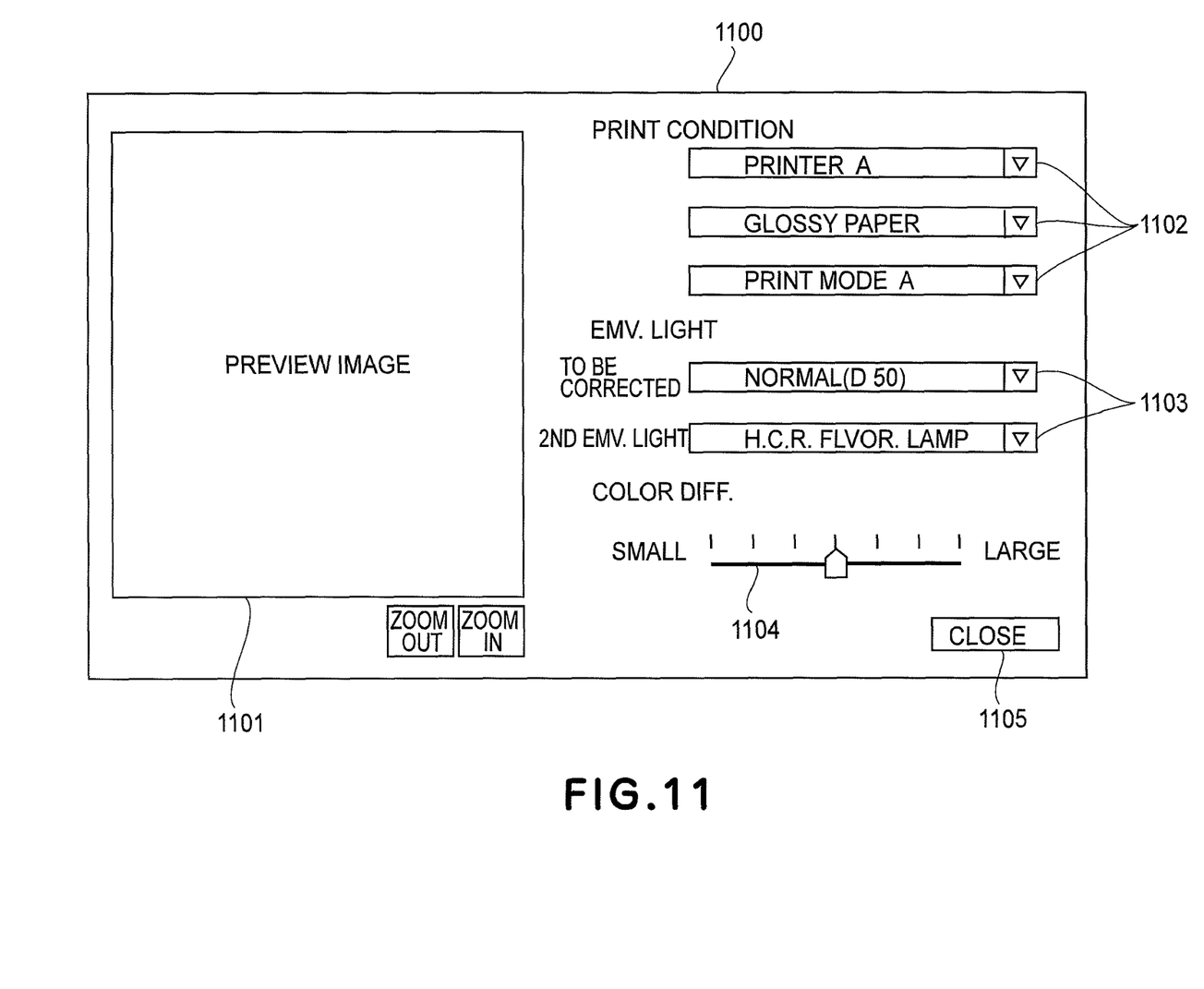
FIG. 11 is a schematic view showing an example of a user interface in Second Embodiment.
Figure 14:
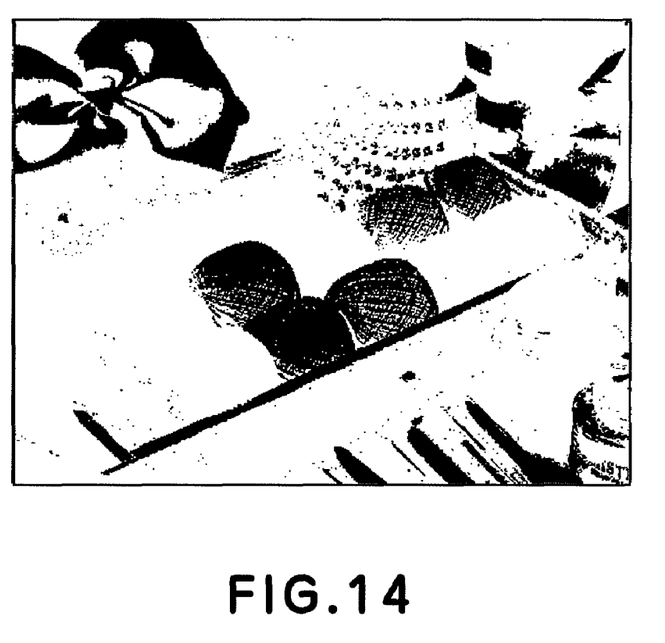
FIG. 14 is a schematic view showing an example of a color difference area image displayed in Second Embodiment.

FIG. 11 is a schematic view showing an example of a user interface in this embodiment. A user interface 1100 displays a color difference area discrimination image on a display 1101. Further, the user interface 1100 can also display a partly enlarged image. With respect to an original image shown in FIG. 15, a display example of the color difference area discrimination image is shown in FIG. 14.

The user can set the type of printer, the type of sheet, and the printing mode by using a display 1102, in which respective times are displayed in a pop-up menu system. The user can appropriately select and set the respective items. By each pop-up menu, a list of selected item is displayed by selecting an inverted triangle area, located at a right end of each rectangular area, with a pointer or the like. The user selects an objective item from the list of the selected item.

A display 1103 is used in the case where light to be corrected and second environment light are set. Each item is, similarly as in the case of the display 1102, displayed as a list of selected item in the pop-up menu system. The user can select the item from the list and sets the selected item. As a type of environment light to be set, e.g., there are normal (standard) light (D50), high color rendering fluorescent lamp, three-waveform fluorescent lamp, and normal fluorescent lamp.

The user can adjust the number of color difference on a scale from "SMALL" to "LARGE". That is, the user determines the number of color difference scale as a plurality of reference values by a slide bar 1104. A color-coded image providing different tone gradation levels within a range defined by the plurality of reference values determined by the slide bar 1104 is displayed on the display 1101 as shown in FIG. 14.

When a button 1105 is pushed down, the display of the user interface is completed.

Thus, in this embodiment, the user can visually confirm the area, in which the change in color depending on the change in environment light is observed, depending on the number of the color difference scale.

(Flow of Processing)

Figure 12:
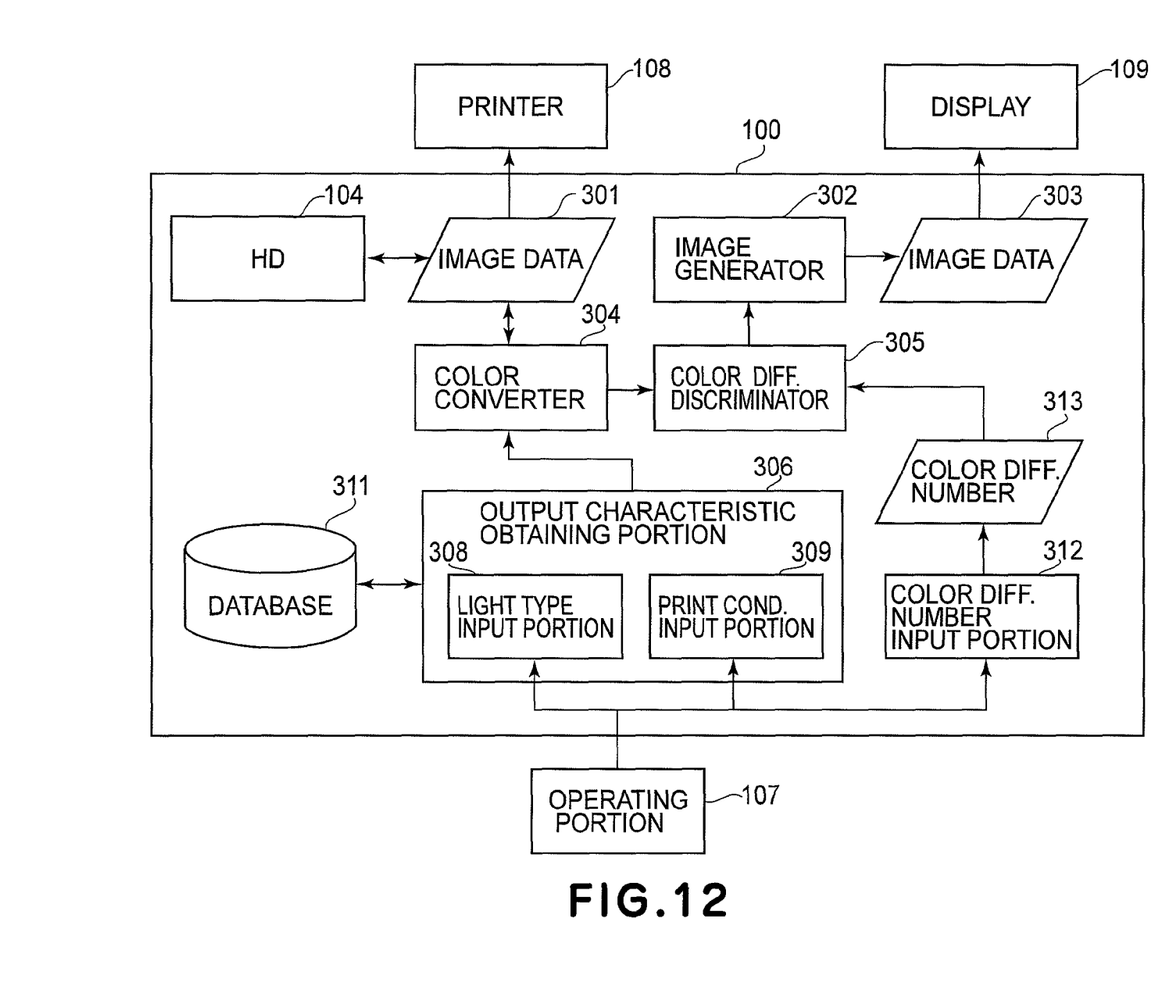
FIG. 12 is a block diagram showing an inner functional constitution of the image processing apparatus in Second Embodiment.
Figure 13:
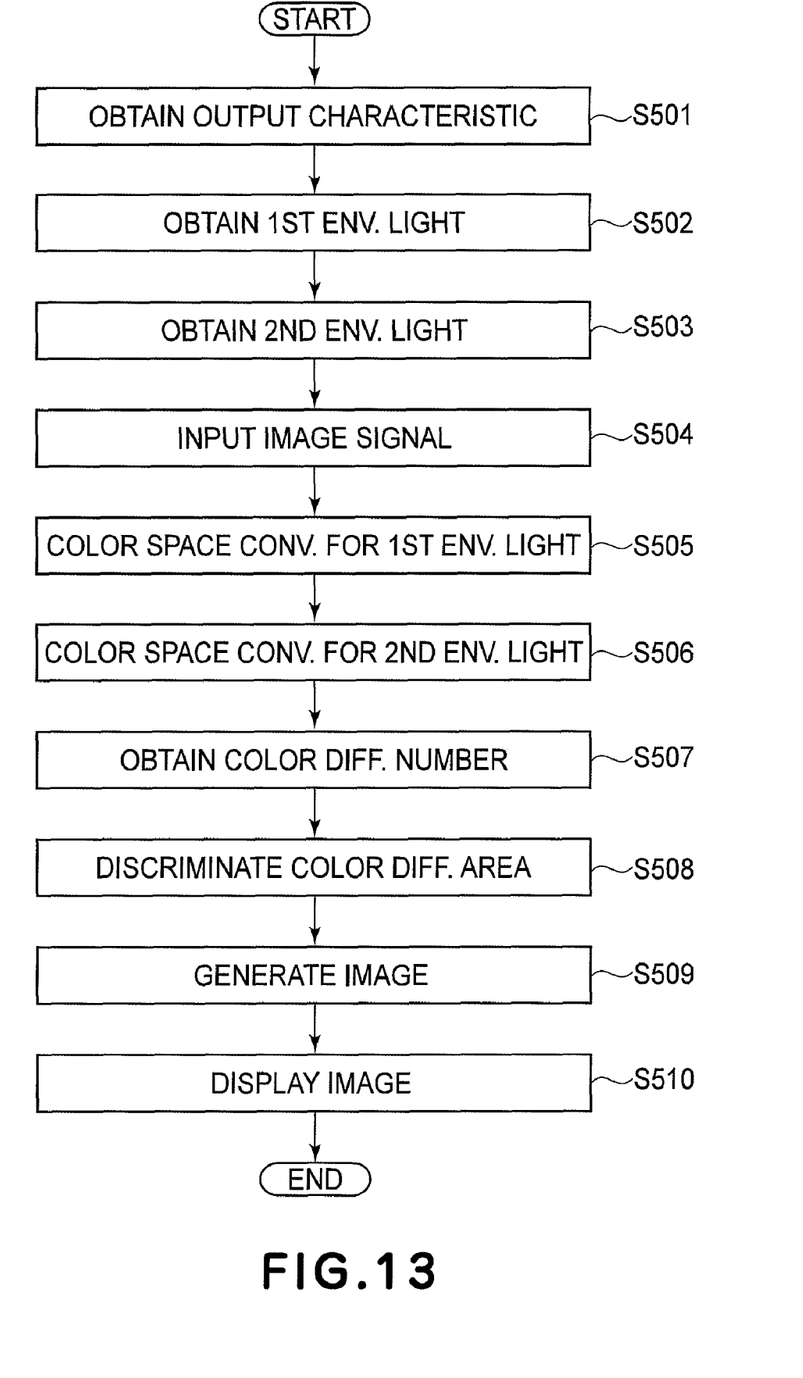
FIG. 13 is a flow chart showing a procedure of a display process of a color difference area image in Second Embodiment.

The flow of the processing in this embodiment will be described based on FIG. 13 with reference to FIG. 12. FIG. 12 is a block diagram showing an inner functional constitution of the image processing apparatus 100 in this embodiment. FIG. 13 is a flow chart showing a procedure of the display processing of the color difference area image in this embodiment. Each of steps in the flow chart is performed under control of the CPU 101 of the image processing apparatus 100.

First, in a step S501, a printing condition input portion 309 of an output characteristic obtaining portion 305 obtains the information on the type of printer, the type of sheet, and the type of printing mode selected by the user through an operating portion 107 and then obtains an output characteristic table (described later) corresponding to the information from a database 311.

In a step S502, an environment light type input portion 308 of the output characteristic obtaining portion 306 obtains the information on the type of first environment light selected by the user through the operating portion 107. Further, from the output characteristic table obtained in the step S501, a color correction table and a conversion table corresponding to the first environment light are obtained. Here, the color correction table is a table used for effecting the color conversion from the normal RGB space to L*a*b* space, and the conversion table corresponding to the first environment light is a table used for effecting the color conversion from the L*a*b* space to printer RGB space.

In a step S503, the environment light type input portion 308 of the output characteristic obtaining portion 305 obtains information on the second environment light selected by the user through the operating portion 107. Further, from the output characteristic table obtained in the step S401, a conversion table corresponding to the second environment light is obtained. Here, the conversion table corresponding to the second environment light is a table used for effecting the color conversion from the printer RGB space to the L*a*b* space.

In a step S504, image data 301 is read from an HDD 104. In the HDD 104, image data taken in through a scanner or the like (not shown in FIG. 1) is stored as the RGB data in advance.

In a step S505, a color conversion portion 304 effects the color correction processing of the image data 301 by using the color correction table obtained in the step S502 to perform the color conversion from the normal RGB space to the L*a*b* space, thus obtaining Lab data of appearance color space. Further, the color conversion portion 304 effects the color conversion of the Lab data by using the conversion table obtained in the step S502 to perform the color conversion from the L*a*b* space to the printer RGB space, thus obtaining the printer RGB data.

In a step S506, the color conversion portion 304 effects the color conversion of the printer RGB data obtained in the step S505 by using the conversion table obtained in the step S503. As a result, the printer RGB space is color-converted into the L*a*b* space to obtain the Lab data of the appearance color space. Here, in order to differentiate the Lab data obtained in this step from that obtained the step S505, the Lab data obtained in this step is referred to as L'a'b' data.

In a step S507, a color difference scale number input portion 312 generates a color difference scale number 313 depending on a slide bar value set by the user through the operating portion 107. The processing in this embodiment is an example of a second determining means in the present invention.

In a step S508, a color difference discriminating portion 305 obtains a color difference between the Lab data obtained in the step S505 and the L'a'b' data obtained in the step S406 with respect to the pixel in the image and discriminates the resultant color difference whether the color difference corresponds to which scale number determined by the color difference scale number 313.

In a step S509, the color difference area discrimination image forming portion 302 generates the color difference area discrimination image data 303 on the basis of the result of the discrimination in the step S508.

In a step S510, the image processing apparatus 100 displays the color difference area discrimination image data 303 on the display 1101 of the display device 109. Here, the user can display the color difference area discrimination image data by changing the color difference scale number through an operation of the slide bar 1104 shown in FIG. 11.

In this embodiment, the user sets the color difference scale number by the slide bar. This means that the user can set the plurality of reference values. Thus, by designating the plurality of reference values, ranges each determined by respective consecutive reference values are present.

On the other hand, by comparing the calculated color difference with the designated plurality of reference values (as an example of a second comparing means in the present invention), it is possible to determine that the color difference belongs to which range. As a result, for each pixel, the calculated color difference can be replaced with a discrete value corresponding to associate one of the plurality of reference values on the basis of the comparison result. Therefore, as shown in FIG. 14, the color difference can be displayed on the display 1101 of the display device with different tone gradation levels.

<Third Embodiment>

Next, Third Embodiment of the present invention will be described. The hardware configuration, the software configuration and the database constitution in the image processing apparatus in this embodiment are similar to those described with reference to FIGS. 1 to 3 and 7.

(User Interface)

Figure 16:
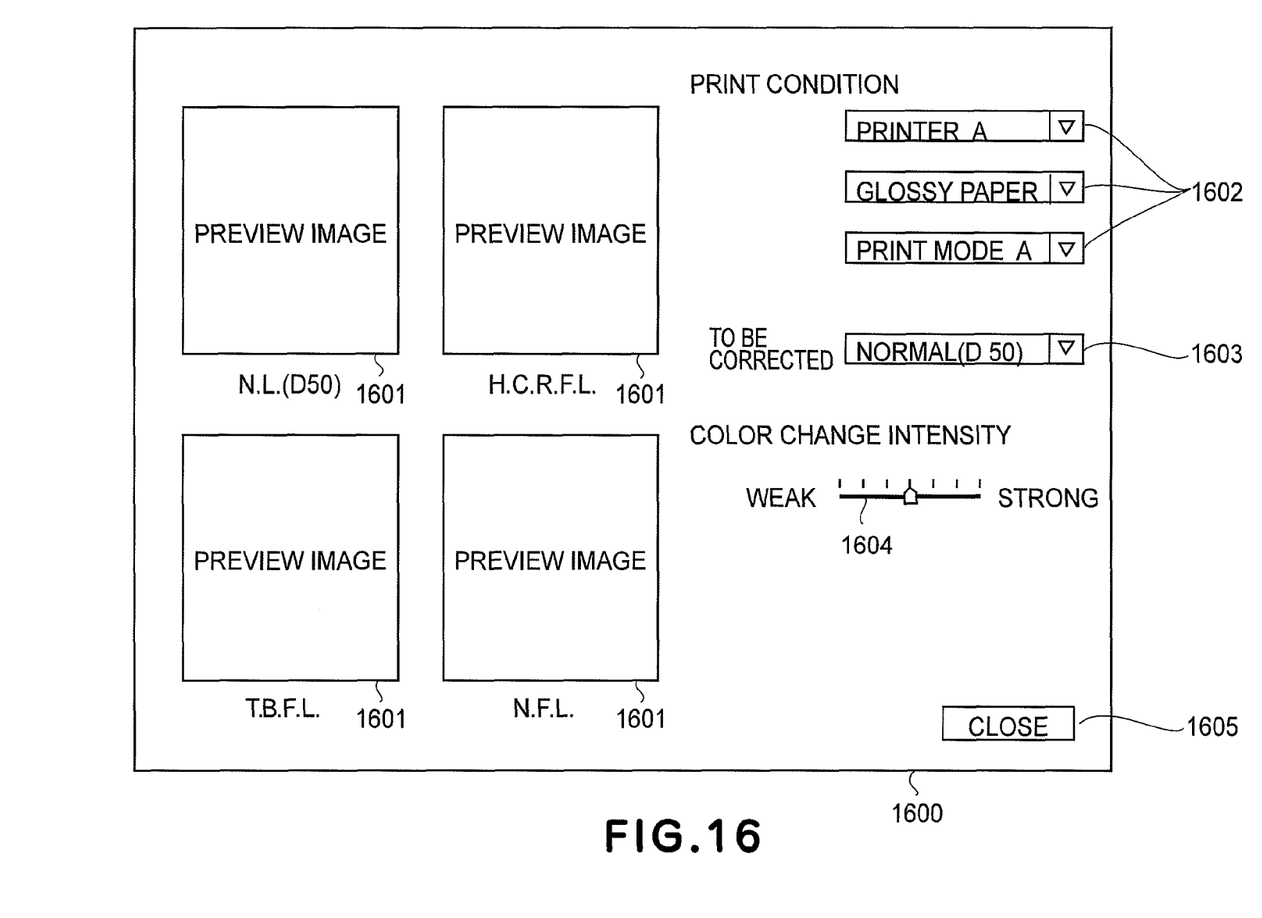
FIG. 16 is a schematic view showing an example of a user interface in Third Embodiment.

FIG. 16 is a schematic view showing an example of a user interface in this embodiment. A user interface 1600 displays a color difference area discrimination image on a display 1601 with respect to four types of environment light such as normal light (N.L.) (D50), high color rendering environment light (H.C.R.F.L.), three wavelength fluorescent lamp (T.W.F.L.), and normal fluorescent lamp (N.F.L.). With respect to an original image shown in FIG. 15, display examples of the color difference area discrimination image are shown in FIGS. 8, 9 and 10, respectively.

The user can set the type of printer, the type of sheet, and the printing mode by using a display 1602, in which respective times are displayed in a pop-up menu system. The user can appropriately select and set the respective items. By each pop-up menu, a list of selected item is displayed by selecting an inverted triangle area, located at a right end of each rectangular area, with a pointer or the like. The user selects an objective item from the list of the selected item.

A display 1603 is used in the case where light to be corrected is set. Each item is, similarly as in the case of the display 1602, displayed as a list of selected item in the pop-up menu system. The user can select the item from the list and sets the selected item. As a type of environment light to be set, e.g., there are normal (standard) light (D50), high color rendering fluorescent lamp, three-waveform fluorescent lamp, and normal fluorescent lamp.

The user can adjust a degree of color difference discrimination tolerance by a slide bar 1604, so that an area with the degree of color difference discrimination tolerance designated by the user through the slide bar 1604 is displayed on the display 1601. For example, as shown in FIG. 16, in the case where a "medium" value of print color change intensity is set as an initial value, a color difference area of a medium degree is displayed on the display 1601 (FIG. 9). Further, in the case where a "strong" value is set, the color difference area of a higher degree is displayed on the display 1601 (FIG. 8). Further, in the case where a "weak" value is set, the color difference area of a lower degree is displayed on the display 1601 (FIG. 10). When a button 1605 is pushed down, the display of the user interface is completed.

Thus, in this embodiment, the user can visually confirm the area, in which the change in color depending on the change in the four types of environment light (in addition to those in First Embodiment) is observed, depending on the degree of the color change intensity on four adjacent displays 1601.

(Flow of Processing)

Figure 17:
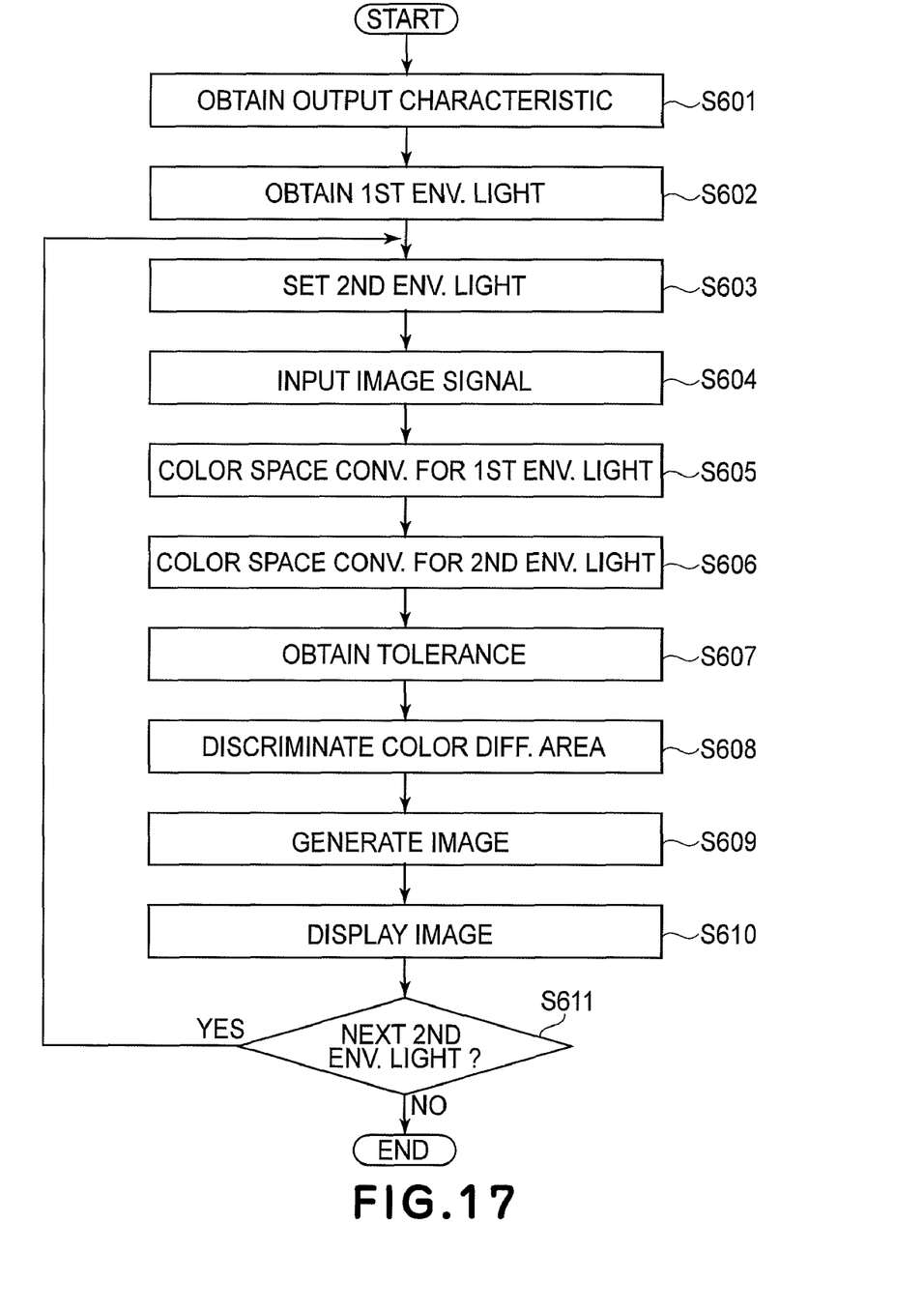
FIG. 17 is a flow chart showing a procedure of a display process of the color difference area image in Third Embodiment.

The flow of the processing in this embodiment will be described based on FIG. 17 with reference to FIG. 5. FIG. 17 is a flow chart showing a procedure of the display processing of the color difference area image in this embodiment. Each of steps in the flow chart is performed under control of the CPU 101 of the image processing apparatus 100.

First, in a step S601, a printing condition input portion 309 of an output characteristic obtaining portion 305 obtains the information on the type of printer, the type of sheet, and the type of printing mode selected by the user through an operating portion 107 and then obtains an output characteristic table corresponding to the information from a database 311.

In a step S602, an environment light type input portion 308 of the output characteristic obtaining portion 306 obtains the information on the type of first environment light selected by the user through the operating portion 107. Further, from the output characteristic table obtained in the step S601, a color correction table and a conversion table corresponding to the first environment light are obtained. Here, the color correction table is a table used for effecting the color conversion from the normal RGB space to L*a*b* space, and the conversion table corresponding to the first environment light is a table used for effecting the color conversion from the L*a*b* space to printer RGB space.

In a step S603, the output characteristic obtaining portion 306 sets one of the four types of environment light as the second environment light. The second environment light is changed every processing from a step S611 (described later). Examples of the environment light may include the normal light (D50), the high color rendering fluorescent lamp, the three wavelength (band) fluorescent lamp, and the normal fluorescent lamp. The information thereon is, e.g., held in a storing area of the RAM or the like in the form a list of the types of environment light and is set as the second environment light in the listed order. Further, from the output characteristic table obtained in the step S601, a conversion table corresponding to the second environment light is obtained. Here, the conversion table corresponding to the second environment light is a table used for effecting the color conversion from the printer RGB space to the L*a*b* space.

In a step S604, image data 301 is read from an HDD 104. In the HDD 104, image data taken a scanner or the like (not shown in FIG. 1) is stored as the RGB data in advance.

In a step S605, a color conversion portion 304 effects the color correction processing of the image data 301 by using the color correction table obtained in the step S602 to perform the color conversion from the normal RGB space to the L*a*b* space, thus obtaining Lab data of appearance color space. Further, the color conversion portion 304 effects the color conversion of the Lab data by using the conversion table obtained in the step S602 to perform the color conversion from the L*a*b* space to the printer RGB space, thus obtaining the printer RGB data.

In a step S606, the color conversion portion 304 effects the color conversion of the printer RGB data obtained in the step S605 by using the conversion table obtained in the step S603. As a result, the printer RGB space is color-converted into the L*a*b* space to obtain the Lab data of the appearance color space. Here, in order to differentiate the Lab data obtained in this step from that obtained the step S605, the Lab data obtained in this step is referred to as L'a'b' data.

In a step S607, a color difference discrimination tolerance input portion 310 generates a color difference discrimination tolerance 307 depending on a value set by the user through the operating portion 107.

In a step S608, a color difference discriminating portion 305 obtains a color difference between the Lab data obtained in the step S605 and the L'a'b' data obtained in the step S606 with respect to each pixel in the image and discriminates the resultant color difference with the color difference discrimination tolerance 307 whether or not the color difference exceeds the color difference discrimination tolerance 307 to discriminate the color difference.

Here, the color difference is calculated according to the equation (1) described in First Embodiment.

In a step S609, the color difference area discrimination image forming portion 302 generates the color difference area discrimination image data 303 on the basis of the result of the discrimination in the step S608.

In a step S610, the image processing apparatus 100 displays the color difference area discrimination image data 303 corresponding to the color difference exceeding the color difference discrimination tolerance on the display 1601 of the display device 109. That is, the display is made with respect to the pixel at which the color difference exceeds the color difference discrimination tolerance in the step S608. Here, the user can display the color difference area discrimination image data by changing the degree of the color difference through an operation of the slide bar 1604 shown in FIG. 16. FIGS. 8, 9 and 10 shows examples of the color difference discrimination images displayed with different degrees of the color difference.

In a step S611, whether or not the environment light to be set as the second environment light is the last environment light listed in the list of the four types of environment light is judged. In the case where the environment light is not the last environment light but a subsequent environment light is present, the processing is returned to the step S603. On the other hand, in the case where the environment light is the last environment light and there is not subsequent environment light, the processing is completed.

As described above, according to this embodiment, the user can visually confirm the color change appearing area due to the change in the type of environment light of the four types of environment light (in addition to those in First Embodiment) depending on the degree of the color change intensity on four adjacent displays.

In the present invention, the case where the operating system (OS) or the like running on the computer performs a part or all of the actual processing on the basis of instructions by (image processing) program codes and thus the functions described in First to Third Embodiments are realized by the processing is also embraced. Further, the present invention is also applied to the case where the program code read from a memory medium is written in a memory provided to a function extending card inserted into the computer or a function extending unit connected to the computer. In this case, on the basis of instructions by the written program code, the CPU or the like provided in the function extending card or unit performs a part or all of the actual processing and thus the functions described in First to Third Embodiments are realized.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 326587/2008 filed Dec. 22, 2008, which is hereby incorporated by reference.

What is claimed is:

1. An image processing apparatus for supplying image data, to be formed by an image forming apparatus, to the image forming apparatus, said image processing apparatus comprising:
   an obtaining unit for obtaining information on first environment light and second environment light different from the first environment light;
   a converting unit for converting data, defined by a color space independent of the image forming apparatus, of the image data into first image data defined by a color space dependent of the image forming apparatus depending on the first environment light and then for converting the first image data into second image data defined by a color space independent of the image forming apparatus depending on the second environment light;
   a discriminating unit for discriminating whether or not a color difference between the first image data and the second image data is a predetermined value or more in an area in which the first image data and the second image data correspond to each other; and
   a display controlling unit for controlling a display unit so that the image data is displayed on the display unit in an image area including an area in which the color difference is the predetermined value or more and including an area in which the color difference is less than the predetermined value.

2. An apparatus according to claim 1, further comprising the display unit for displaying the image data.

3. An apparatus according to claim 1, further comprising a first receiving unit for receiving at least one of information on the image forming apparatus, information on a sheet, and information on a printing mode,
   wherein said converting unit converts the image data on the basis of the information received by said first receiving unit.

4. An apparatus according to claim 1, further comprising a second receiving unit for permitting determination of the predetermined value by a user.

5. An apparatus according to claim 4, wherein said second receiving unit permits determination of the predetermined value by the user at a plurality of levels,
   wherein said discriminating unit discriminates the color difference whether the color difference belongs to which range of the plurality of levels of the predetermined value, and
   wherein said display controlling unit controls the display unit so that the predetermined image data is displayed in the image area including the areas varying depending on the range.

6. An apparatus according to claim 1, wherein said obtaining unit obtains information on third environment light different from the first environment light and the second environment light,
   wherein said converting unit converts the first image data into third image data defined by a color space independent of the image forming apparatus, depending on the third environment light,
   wherein said discriminating unit discriminates the image data between the first image data and the third image data is the difference value or more in an area in which the first image data and the third image data correspond to each other, and
   wherein said display controlling unit controls the display unit so that the predetermined image data to be displayed in an image area including an area in which the color difference between the first image data and the second image data is the predetermined value or less and an area in which the color difference between the first image data and the second image data is less than the predetermined value, and the image data to be displayed in an image area including an area in which the color difference between the first image data and the third image data is the predetermined value or less and an area in which the color difference between the first image data and the third image data is less than the predetermined value, are displayed on the display unit at the same time.

7. An image processing method for supplying image data, to be formed by an image forming apparatus, to the image forming apparatus, said image processing method comprising:
   a step of obtaining information on first environment light and second environment light different from the first environment light;
   a step of converting data, defined by a color space independent of the image forming apparatus, of the image data into first image data defined by a color space dependent of the image forming apparatus depending on the first environment light and then for converting the first image data into second image data defined by a color space independent of the image forming apparatus depending on the second environment light;
   a step of discriminating whether or not a color difference between the first image data and the second image data is a predetermined value or more in an area in which the first image data and the second image data correspond to each other; and
   a step of displaying the image data is on a display unit in an image area including an area in which the color difference is the predetermined value or more and including an area in which the color difference is less than the predetermined value.

* * * * *